United States Patent [19]
Matsumoto et al.

[11] Patent Number: 5,615,729
[45] Date of Patent: Apr. 1, 1997

[54] CURTAIN WINDING APPARATUS

[75] Inventors: Tohru Matsumoto; Sadayuki Matsurugi, both of Hyogo, Japan

[73] Assignee: Mitsubishi Denki Kabushiki Kaisha, Tokyo, Japan

[21] Appl. No.: 693,506

[22] Filed: Aug. 8, 1996

Related U.S. Application Data

[63] Continuation of Ser. No. 505,656, Jul. 21, 1995.

[30] Foreign Application Priority Data

Oct. 26, 1994 [JP] Japan ................... 6-262482

[51] Int. Cl.$^6$ ........................................ B60J 3/00
[52] U.S. Cl. ................ 160/370.22; 160/265; 296/97.4; 296/97.8
[58] Field of Search ............... 160/265, 370.21, 160/370.22, 370.23, 387, 401, 402, 84.07, 84.04, 68; 296/97.1, 97.6, 97.7, 97.8, 143, 97.4

[56] References Cited

U.S. PATENT DOCUMENTS

| | | | |
|---|---|---|---|
| 1,025,116 | 5/1912 | Bower et al. | 160/401 |
| 1,183,819 | 5/1916 | Keiser . | |
| 4,836,263 | 6/1989 | Ament | 160/370.22 X |
| 5,076,633 | 12/1991 | Hsu et al. | 296/97.8 X |

FOREIGN PATENT DOCUMENTS

| | | | |
|---|---|---|---|
| 240747 | 10/1987 | European Pat. Off. | 296/97.8 |
| 0221573 | 5/1989 | European Pat. Off. | |
| 3539513A1 | 5/1987 | Germany . | |
| 494096 | 8/1992 | Japan . | |
| 6001144 | 1/1994 | Japan | 296/97.8 |
| 4025300 | 11/1994 | WIPO | 296/97.8 |

*Primary Examiner*—Blair Johnson
*Attorney, Agent, or Firm*—Sughrue, Mion, Zinn, Macpeak & Seas

[57] ABSTRACT

A curtain winding apparatus including a blind, a winding mechanism containing a drive motor in a winding pipe, and a drawing mechanism for drawing the blind by stretching an arm, wherein a torsion coil spring is provided for energizing the leading end portion of the arm of the drawing mechanism in the direction substantially perpendicular to the curtain surface. A cylindrical portion is formed on the base end portion of the blind, and the winding pipe is inserted in the cylindrical portion. A pressing pipe C-shaped in cross-section is fitted around the outer periphery of the winding pipe by way of the cylindrical portion so that the cylindrical portion is held between the pressing pipe and the winding pipe. The leading end side of the curtain is thus drawn from the slit of the pressing pipe. With this winding apparatus, it becomes possible to easily adjust the mounting angle of the drawing mechanism and to prevent the leakage of operational noise of the drive motor.

5 Claims, 8 Drawing Sheets

CURTAIN WINDING APPARATUS

This is a continuation of application Ser. No. 08/505,656 filed Jul. 21, 1995.

BACKGROUND OF THE INVENTION

1. Field of the Invention

The present invention mainly relates to an apparatus for winding a curtain such as a motor-driven roll blind to be mounted on a rear windshield of a car.

2. Description of the Related Art

Figure 4:
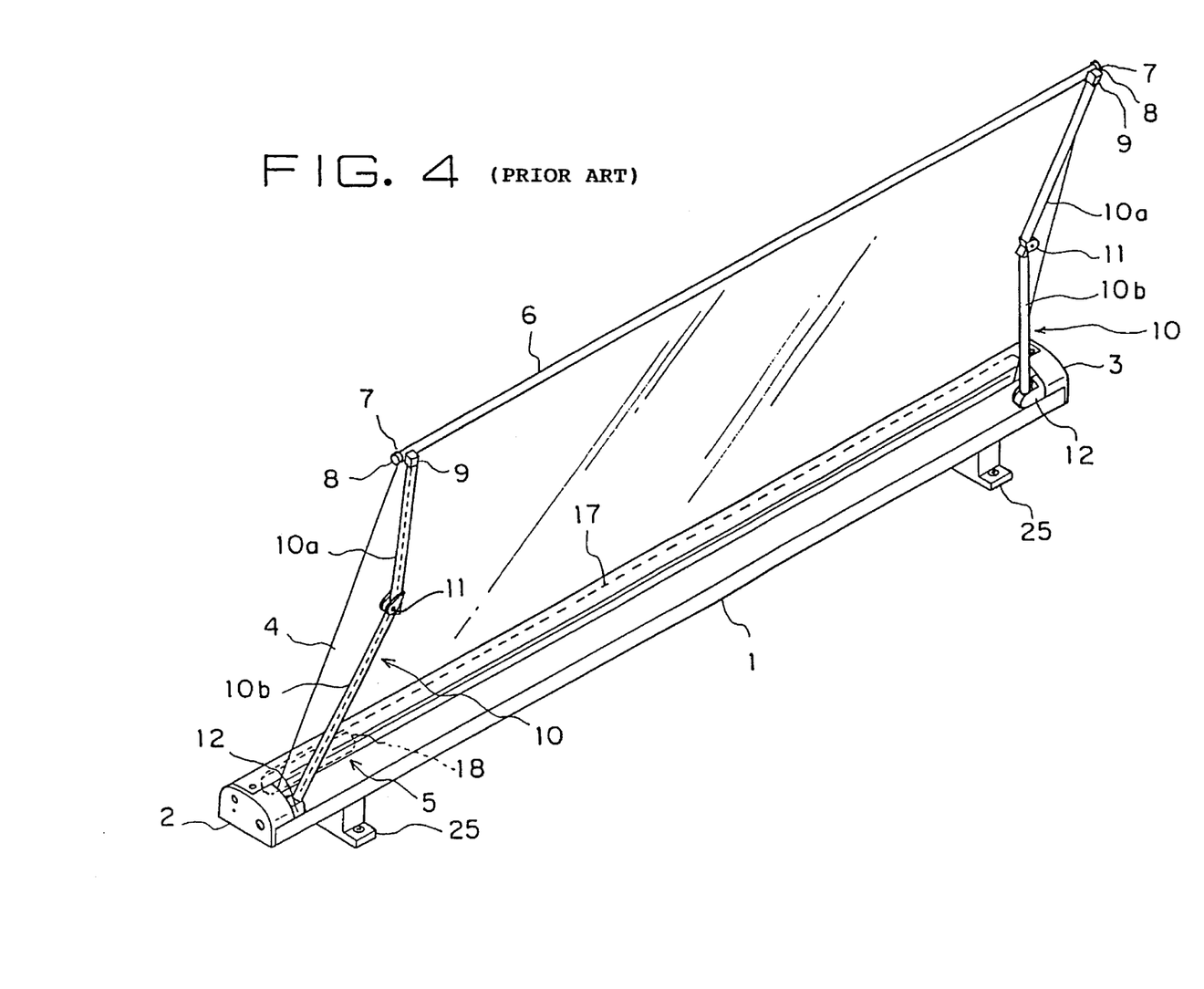
FIG. 4 is a perspective view showing the whole construction of a prior art curtain winding apparatus.
Figure 5:
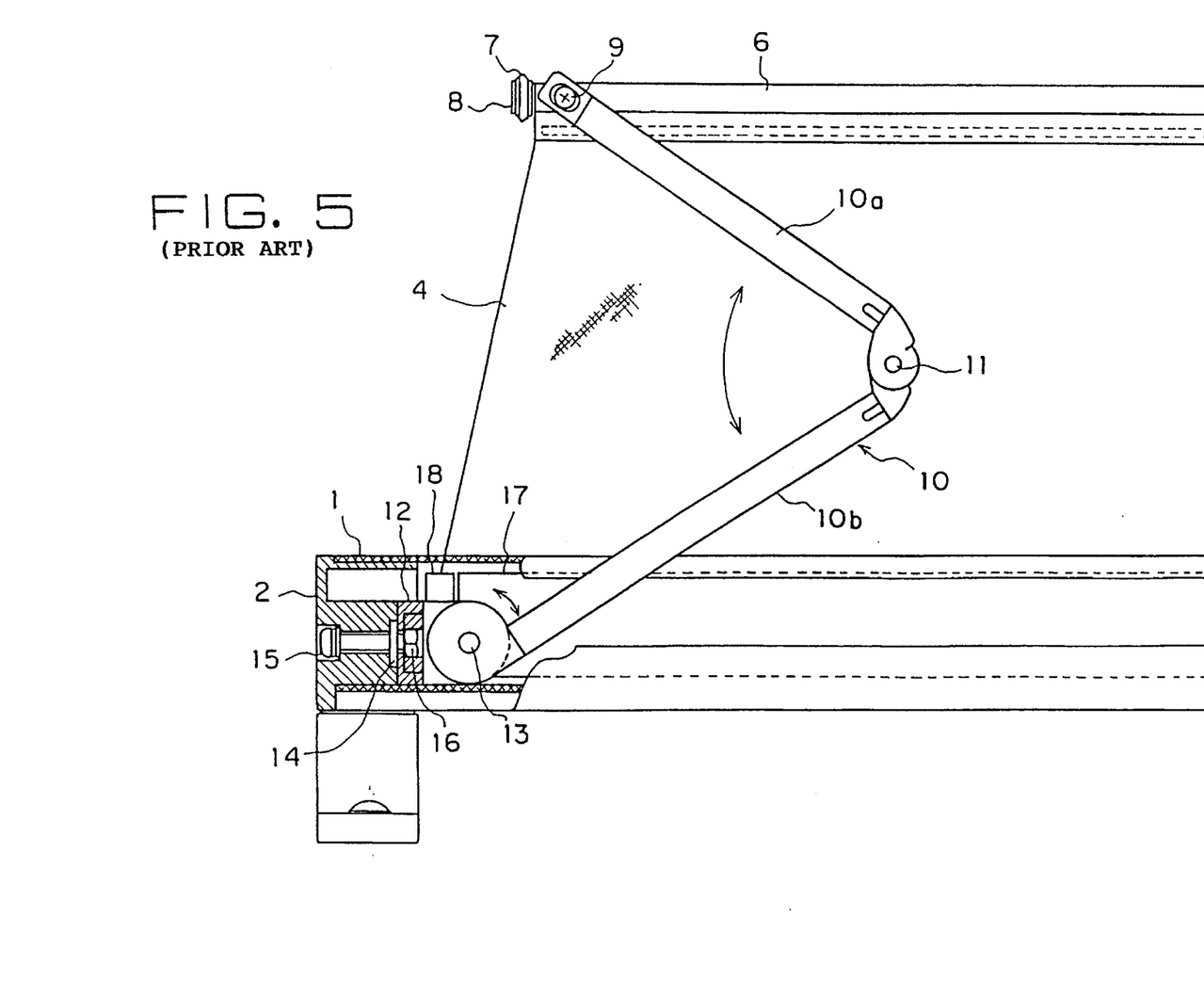
FIG. 5 is a front view showing the left half of the prior art curtain winding apparatus.

FIG. 4 is a perspective view showing the whole construction of a prior art a curtain winding apparatus; and FIG. 5 is a front view showing the left half of the prior art curtain winding apparatus. In FIGS. 4 and 5, reference numeral 1 indicates a long-size box shaped base; 2 and 3 indicate holders fitted at both the longitudinal end portions of the base 1 so as to be laterally symmetric to each other; 4 is a blind as the curtain; 5 is a winding mechanism disposed in the base 1 for holding the base end portion of the blind 4 and winding the blind 4; 6 is a drawing pipe mounted on the upper end portion (leading end) of the blind 4; 7 is a roller having an elastic body such as an O-ring around the outer periphery thereof; 8 is a roller holder for rotatably mounting the roller 7 at the end portion of the drawing pipe 6; and 10, 10 are drawing mechanisms disposed to be laterally symmetric to each other for holding the drawing pipe 6 and drawing the blind 4.

Each drawing mechanism 10 includes two arms 10a, 10b connected to each other by means of a pin 11 as an articulated joint; and an arm holder 12 for fixing the arm 10b on the base end side to the holder 2 or 3. The arms 10a, 10b of the right and left drawing mechanisms 10 are provided to be respectively flexible within the same plane containing the base 1, and are usually energized in the direction of stretching the articulated joints by springs or the like (not shown) contained therein. As shown in FIG. 5, the end portion of the arm 10b on the base end side is connected to the arm holder 12 by means of a pin 13 in such a manner as to be rotabaly supported around the pin 13 within the flexible plane of the arms 10a, 10b. The leading end of the arm 10a on the leading end side is pin-connected to the end portion of the drawing pipe 6 by means of a screw 9. Accordingly, when the articulated joint (pin 11) of the arms 10a and 10b of each of the right and left drawing mechanisms 10 is expanded/contracted (flexibly operated) as shown in FIG. 5, the base end of the arm 10b is turned around the pin 13, so that the arms 10a, 10b connected to the drawing pipe 6 equivalent to a link are expanded/contracted within the plane containing the base 1 as a whole.

The arm holder 12 is fixed on the holder 2 or 3 by means of a bolt 15 and a nut 16 through a toothed washer 14. In this case, the arm holder 12 can be turned around the bolt 15 by loosening the bolt 15, and accordingly, the mounting angle of the drawing mechanism 10 (mounting angle within a plane perpendicular to the longitudinal direction of the base 1) can be adjusted in accordance with the type of car.

Figure 6:
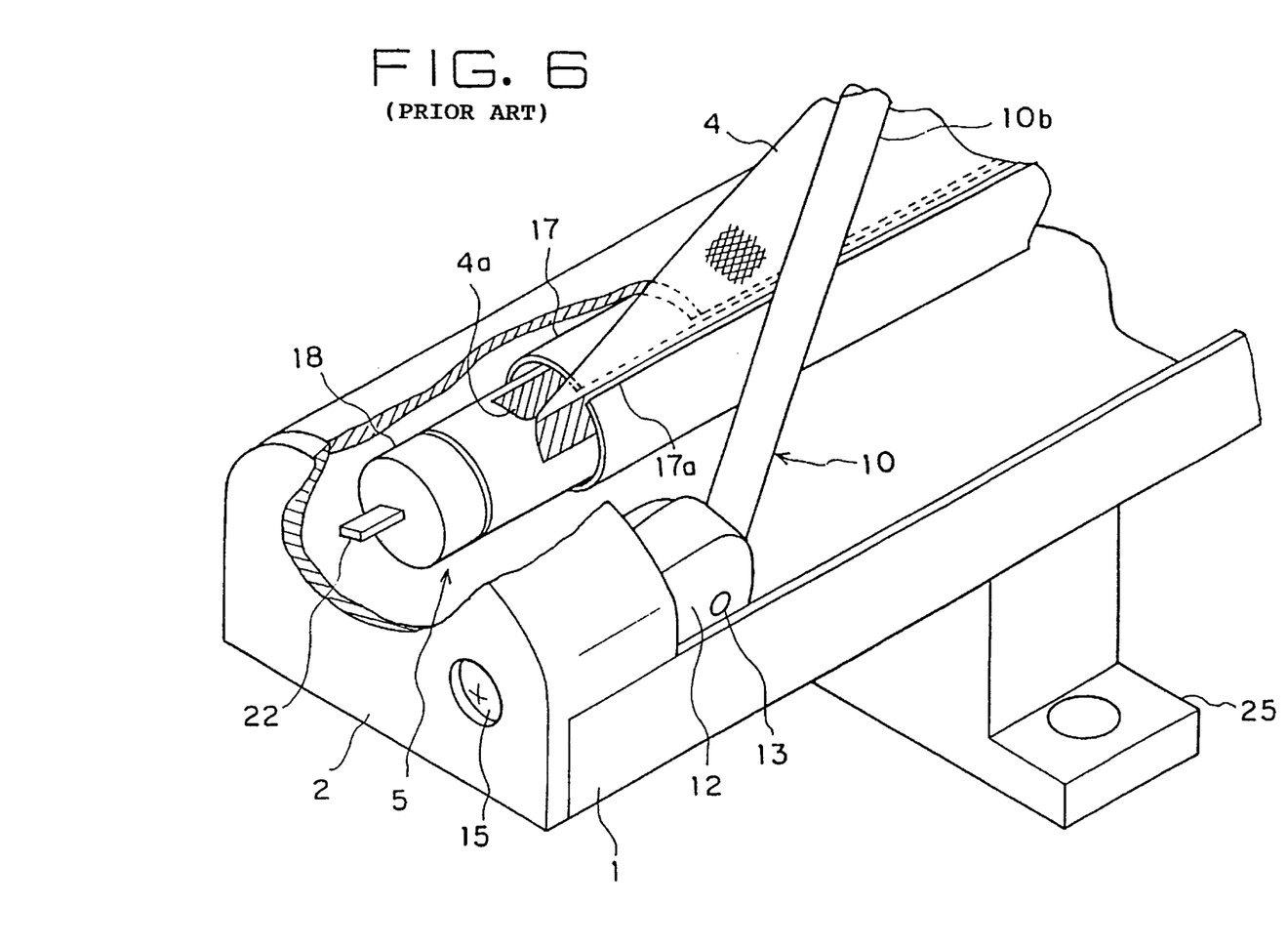
FIG. 6 is a partially enlarged perspective view showing the details of a winding pipe portion of the prior art curtain winding apparatus.

FIG. 6 is a construction view showing essential portions of the winding mechanism 5. The winding mechanism 5 has a winding pipe 17 provided with a slit 17a. By insertion of a slip-off preventive portion 4a provided at the base end portion of the blind 4 into the slit 17a, the base end portion of the blind 4 is engaged with the winding pipe 17.

Figure 7:
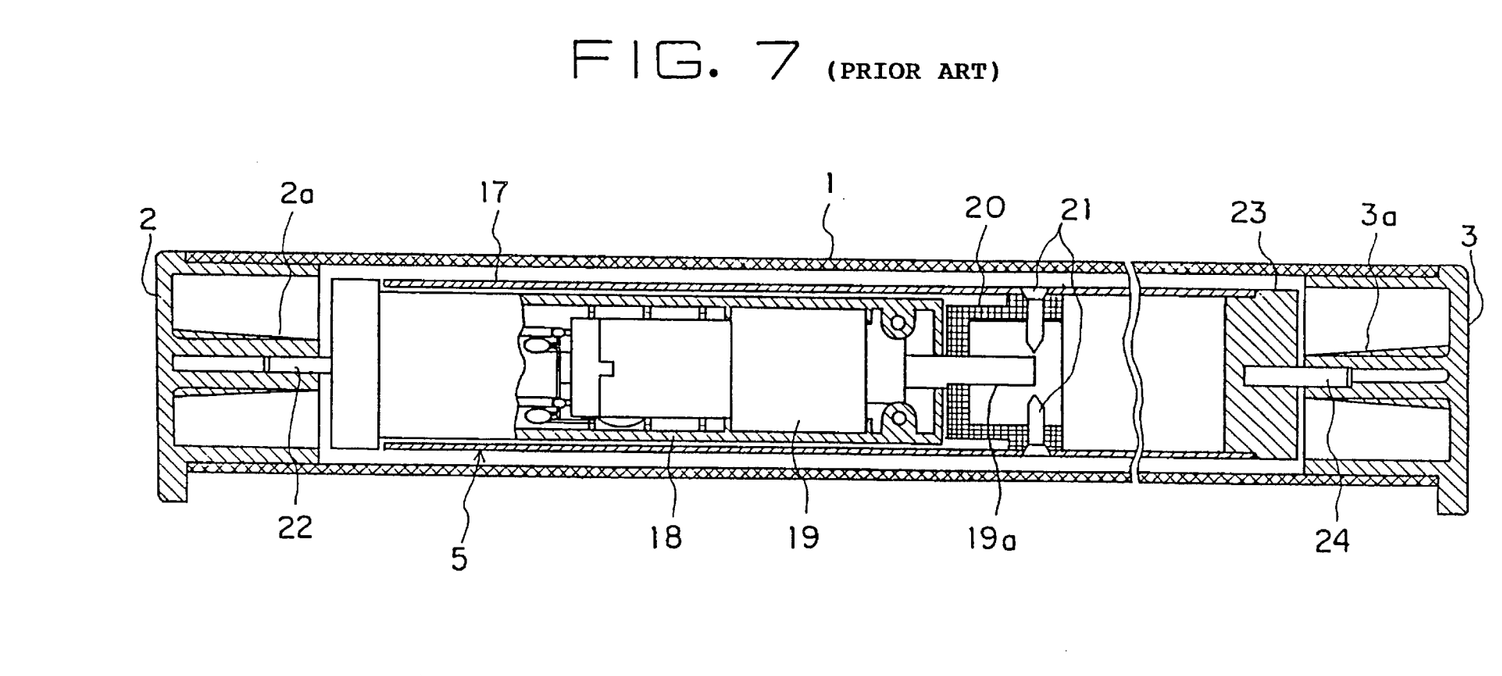
FIG. 7 is a sectional view showing the internal structure of a winding pipe of the prior art curtain winding apparatus.

FIG. 7 is a construction view showing the internal structure of the winding mechanism 5. The winding mechanism 5 has a drive portion case 18, a drive motor 19 provided in the case 18, and a joint 20 fitted to an output shaft 19a of the drive motor 19, in addition to the above-described winding pipe 17. The joint 20 is connected to the winding pipe 17 by means of a tapping screw 21. Reference numeral 22 indicates an angular pin fixed at the center of the leading end of the drive portion case 18. The drive portion case 18 is fixed at a boss portion 2a of the holder 2 by means of the angular pin 22. Reference numeral 23 indicates an end surface plate fixed at the end portion of the winding pipe 17. By insertion of a round pin 24 fixed at the center of the end surface plate 23 into the boss portion 3a of the holder 3, the winding pipe 17 is rotatably supported on the holder 3. A limit switch (not shown) for restricting the rotational angle of the drive motor 19 is contained in the drive portion case 18. By the use of the limit switch, the drawing length of the blind 4 can be adjusted in accordance with the type of car.

Figure 8:
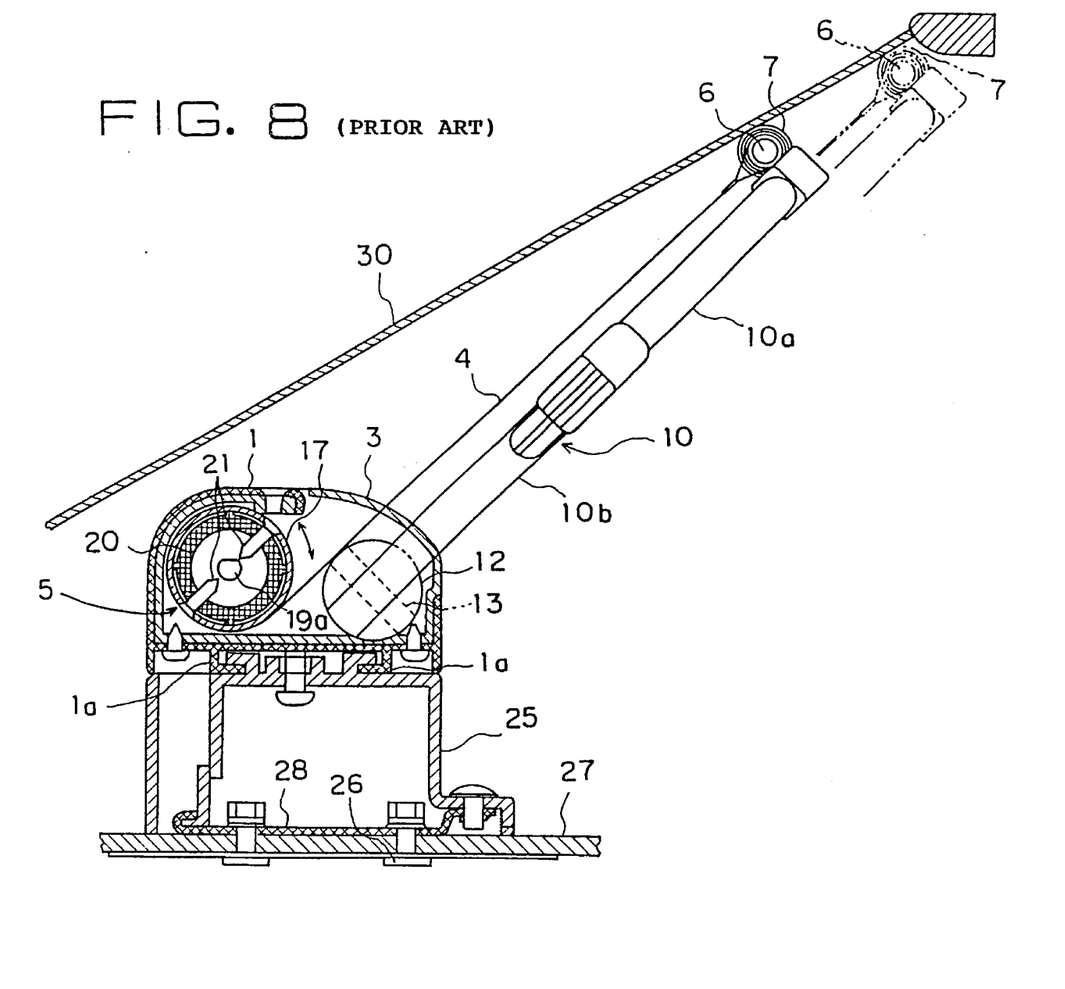
FIG. 8 is a sectional side view showing the whole construction of the prior art curtain winding apparatus.

FIG. 8 is a view showing the mounting mode of the curtain winding apparatus. In the figure, reference numeral 25 indicates a mounting leg slidable in the longitudinal direction within an L-shaped hook 1a of the base 1. By hooking of the mounting leg 25 to a bracket 28 fixed on a rear shelf 27 on the rear side of the rear seat of a car by means of a bolt 26, the base 1 as the main portion of the curtain winding apparatus is mounted on the car. An operational switch (not shown) is mounted on a portion near a driver's seat.

Next, the operation of the winding apparatus of the present invention will be described. Upon the mounting of the curtain winding apparatus, since the inclination of a rear windshield 30 as shown in FIG. 8 is different in accordance with the type of car, the mounting angles of the arm holders 12 of the right and left drawing mechanisms 10 are adjusted in accordance with the inclination of the rear windshield 30 by loosening the bolts 15 shown in FIG. 5, so that the angles of the right and left drawing mechanisms 10 are made to correspond to each other. At this time, when the blind 4 is drawn, the mounting angles of the arm holders 12 are adjusted such that the portions where the rollers 7 are contacted with the rear windshield 30 of the car are lower than the upper ends of the rear windshield 30 by about 5 cm. In such a mounting state, the drive motor 19 of the winding mechanism 5 is normally or reversely rotated by turning on the operational switch (not shown), and the rotation is transmitted to the winding pipe 17 through the joint 20. The winding pipe 17 is thus rotated as shown by the arrow in FIG. 8 around the round pin 24. Since the blind 4 is usually applied with a tensile strength by the drawing mechanisms 10, it is wound or drawn in the stretched state in accordance with the rotation of the winding mechanism 5. At this time, the arms 10a, 10b are bent in the direction shown by the arrow in FIG. 5, and are expanded/contracted as a whole. The drive motor 19 is automatically stopped at the drawing upper end or the winding lower end by the limit switch (not shown) contained in the drive portion case 18 shown in FIG. 7, thus stopping the winding or drawing operation. When the blind 4 is drawn as shown in FIG. 8, the mounting angles of the arm holders 12 are adjusted such that the portions where the rollers 7 are contacted with the rear windshield 30 of the car are lower than the upper ends of the rear windshield 30 by about 5 cm, and accordingly the rollers 7 are rolled from the positions where the rollers 7 are contacted with the windshield 30 to the upper ends of the rear windshield 30, and thereby at the upper ends of the rear windshield 30, the rollers 7 are pressed on the rear windshield 30 by the deflected amounts of the drawing mechanisms 10, thus preventing the rattling of the blind 4 during running of the car.

In addition, since the mounting leg 25 is slidable in the longitudinal direction of the L-shaped hook 1a of the base 1 as shown in FIG. 8, it can be provided on an empty position without any obstacle (for example, speaker, air cleaner, stop lamp or the like) on the rear shelf 27, thus making it possible to enhance the mounting versatility to various types of cars.

The prior art curtain winding apparatus having the above-described construction, however, has the following disadvantages: namely, the positions where the rollers 7 are contacted with the rear windshield 30 must be adjusted while the mounting angles of the right and left independent drawing mechanism 10 are made to correspond to each other, thus taking a lot of labor and time; and further, the slit 17a is provided in the winding pipe 17 constituting the winding mechanism 5 and the base end portion of the blind 4 is fixedly inserted in the slit 17a, and consequently operational noise of the drive motor 19 is exteriorly leaked from the slit 17a to the extent being offensive to the ear.

SUMMARY OF THE INVENTION

Accordingly, an object of the present invention is to provide a curtain winding apparatus capable of simply adjusting the mounting angle of the winding apparatus relative to a rear windshield having an angle changed on the basis of the type of car. Another object of the present invention is to provide a curtain winding apparatus capable of reducing noise caused by an operated drive motor.

According to a first aspect of the present invention, there is provided a curtain winding apparatus for energizing a leading end portion of an arm of a drawing mechanism in the direction substantially perpendicular to a curtain surface of the curtain by an energizing mechanism. The arm is energized by the energizing mechanism, and accordingly, for example, in the case of provision of a curtain along a rear windshield of a car, a leading end portion of the curtain can be usually pressed on the rear windshield side in the state that it is drawn to some extent. Consequently, the arm can be automatically adjusted at an angle corresponding to the inclination of the rear windshield, so that it becomes possible to eliminate the necessity of manually adjusting the mounting angle of the drawing mechanism.

The above energizing means preferably includes a torsion coil spring for energizing a portion, which rotatably holds the other leading end portion of said arm within a plane substantially parallel to the curtain-surface of said curtain, in said direction substantially perpendicular to said curtain surface of said curtain.

According to a second aspect of the present invention, there is provided a curtain winding apparatus, wherein a cylindrical portion is formed on the base end portion of said curtain; said winding pipe is inserted in said cylindrical portion; a pressing pipe which is C-shaped in cross-section and has a longitudinal slit is fitted around the outer periphery of said winding pipe by way of said cylindrical portion, so that said cylindrical portion is held between said pressing pipe and said winding pipe; and the leading end side of said curtain is drawn from said slit. In the present invention, the winding pipe is inserted in the cylindrical portion formed on the base end portion of a curtain and the pressing pipe is fitted around the cylindrical portion, so that the base end portion of the curtain is fixed to the winding pipe and the leading end side of the curtain is drawn from the slit provided in the pressing pipe; accordingly, it is possible to eliminate the necessity of providing any slit liable to cause the leakage of noise of the drive motor.

DETAILED DESCRIPTION OF THE PREFERRED EMBODIMENTS

Figure 1:
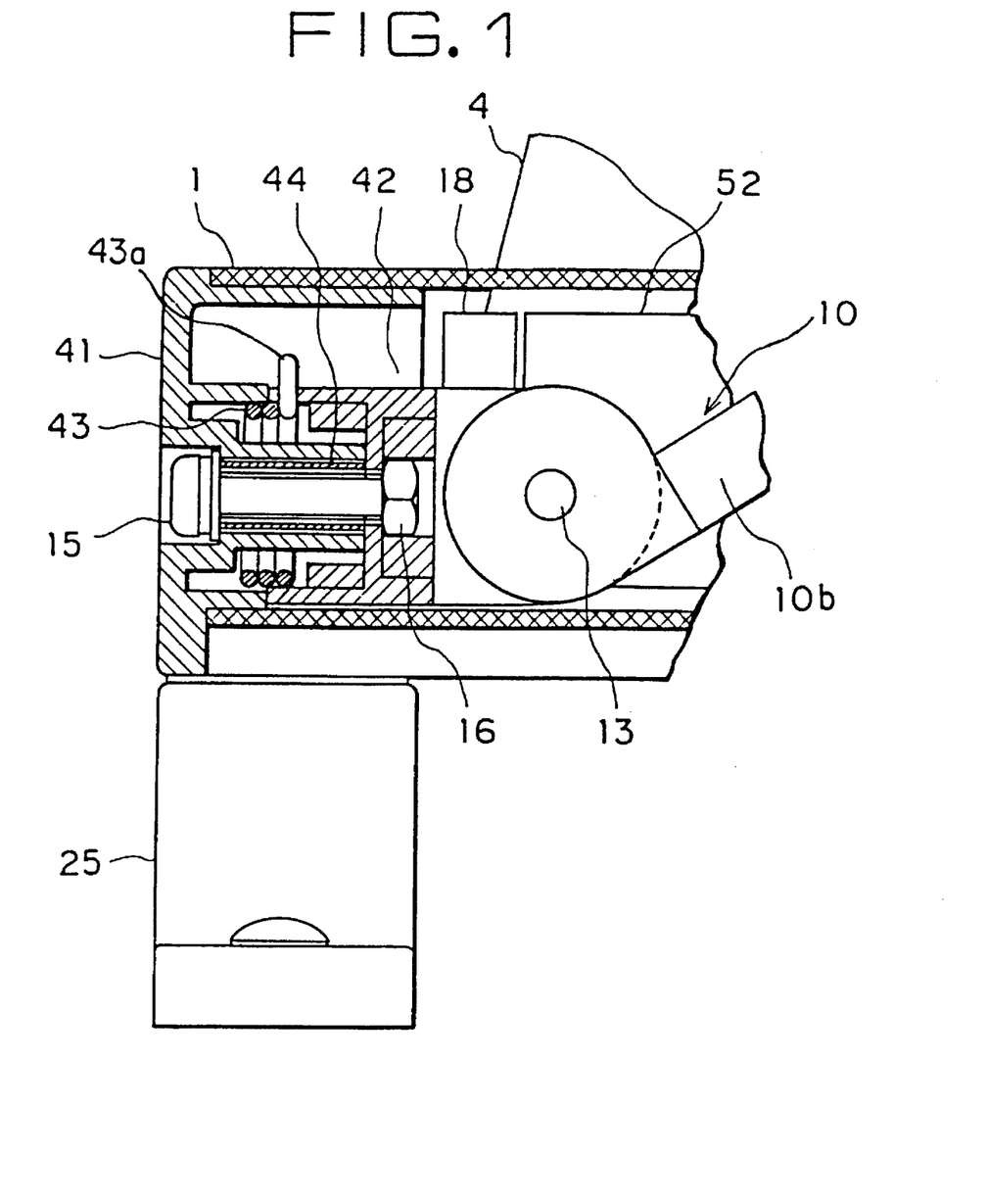
FIG. 1 is a partially sectional view showing the details of a holder portion of a curtain winding apparatus according to one embodiment of the present invention, as seen from the front side.
Figure 2:
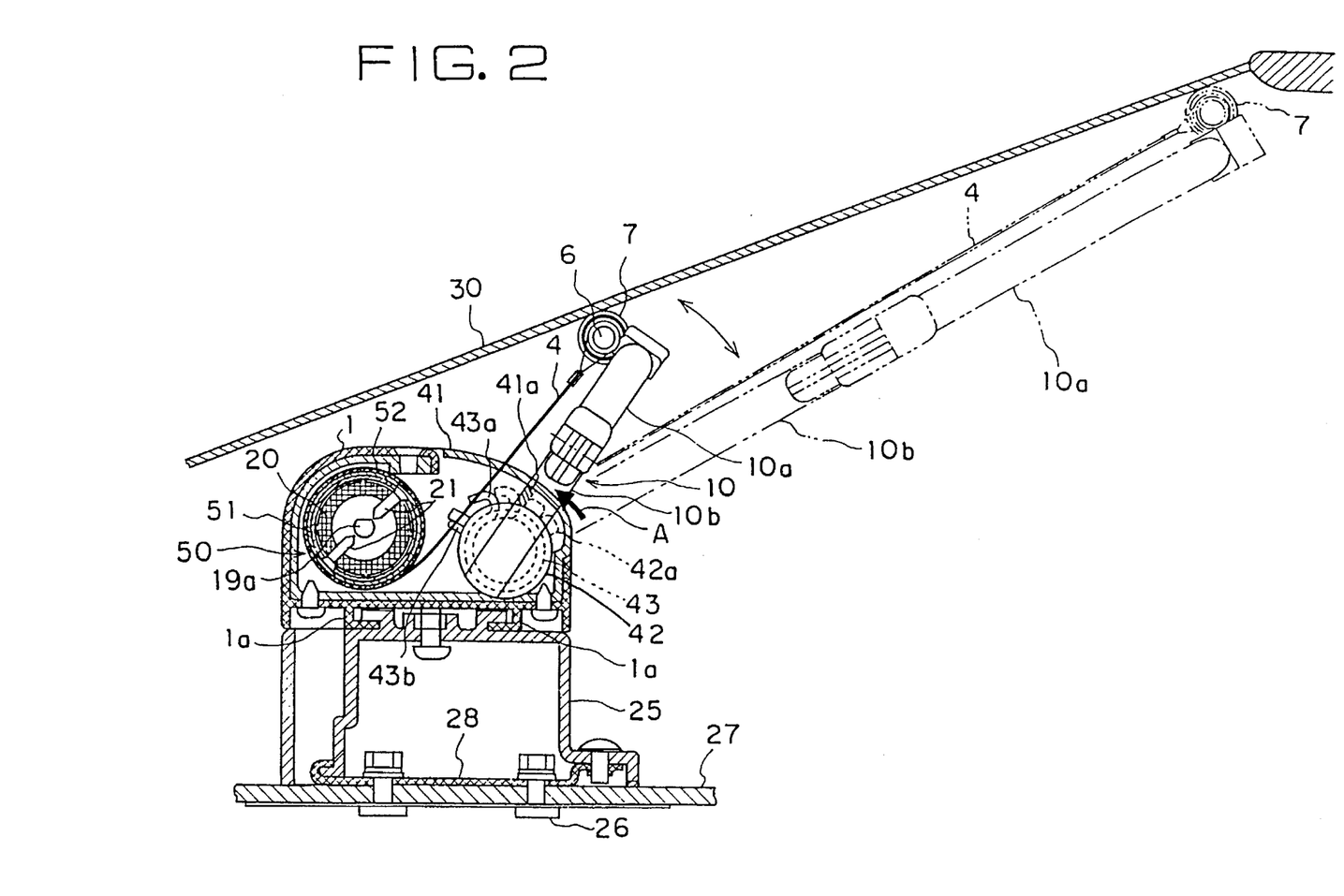
FIG. 2 is a sectional side view showing the construction of the curtain winding apparatus according to the embodiment of the present invention.
Figure 3:
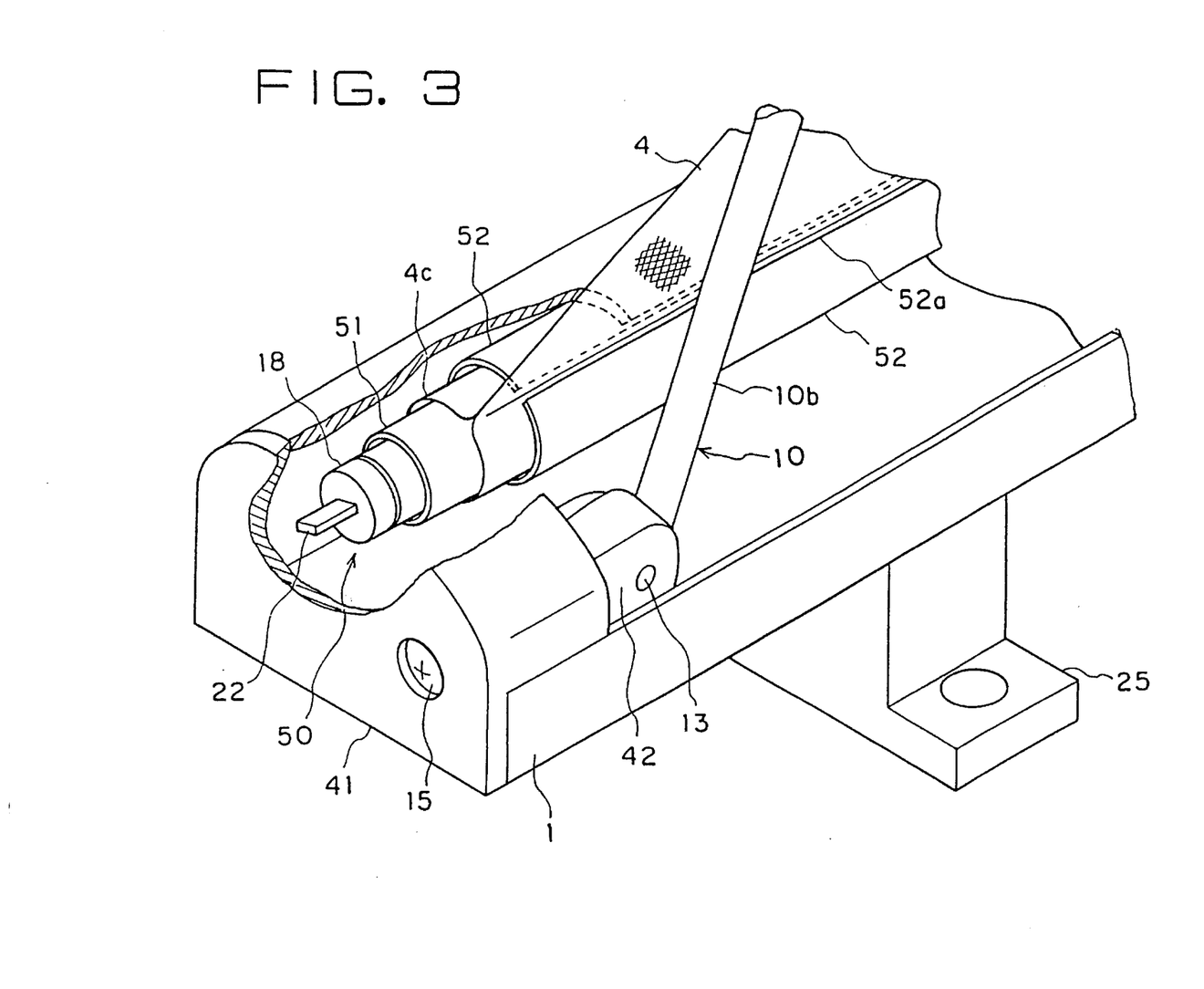
FIG. 3 is a partially enlarged perspective view showing the details of a winding pipe portion of the curtain winding apparatus according to the embodiment of the present invention.

FIG. 1 is a partially sectional view showing the details of a holder portion of a curtain winding apparatus according to one embodiment of the present invention; FIG. 2 is a sectional side view showing the whole construction of the curtain winding apparatus; and FIG. 3 is a partially enlarged view showing the construction of a winding pipe portion. In these figures, parts being the same as or corresponding to those in the prior art apparatus are indicated at the same characters, and the explanation thereof is omitted.

In FIGS. 1 and 2, reference numeral 41 indicates a holder fitted onto the end portion of a base 1; and 42 is an arm holder rotatably fixed on the holder 41 by a bolt 15 and a nut 16 through a pipe-like spacer 44. The arm holder 42 is restricted in its rotating angle by a stopper 42a formed around the outer periphery of the arm holder 42, and a rib 41a formed on the holder 41. In the arm holder 42, the initial angle is determined depending on the positional relationship between the stopper 42a and the rib 41a. Like the prior art shown in FIGS. 4 to 8, an arm 10b on the base end side is rotatably connected to the arm holder 42 by means of a pin 13. A drawing mechanism 10 is constituted of these arms 10a, 10b, the arm holder 42 and the like.

Reference numeral 43 indicates a torsion coil spring as an energizing mechanism interposed between the holder 41 and the arm holder 42. Hooks 43a and 43b are formed on both the ends of the torsion coil spring 43. One hook 43a is engaged with a cutout groove (not shown) provided on the arm holder 42 side, and the other hook 43b is engaged with a cutout groove (not shown) provided on the holder 41 side. The arm holder 42 is energized in the direction of the arrow A in FIG. 2 around the bolt 15 by the torsion coil spring 43. As a result, the arms 10a, 1ob of the drawing mechanism 10 are usually energized in the direction substantially perpendicular to the curtain surface of the drawn blind 4 (in the direction approaching the rear windshield 30 in FIG. 2). In the initial state, the stopper 42a is thus closely contacted with the rib 41a by the spring force of the torsion coil spring 43. The right holder has also the above-described structure, and it is laterally symmetric to the left holder.

In FIGS. 2 and 3, reference numeral 4 indicates a blind, and a cylindrical portion 4c is formed on the base end portion of the blind 4. In the winding mechanism 50 in this embodiment, a circular pipe with no slit is used as a winding pipe 51. The winding pipe 51 is inserted in the cylindrical portion 4c, and a pressing pipe 52 C-shaped in cross-section is fitted around the outer periphery of the winding pipe 51 by way of the cylindrical portion 4c. In other words, the cylindrical portion 4c is fixedly held between the winding pipe 51 and the pressing pipe 52 so as not to be slid. The leading end of the blind 4 is extended from a slit 52a longitudinally formed in the pressing pipe 52. In addition, a drive portion case 18 containing a drive motor (not shown) is contained in the winding pipe 51 similarly to the prior art (see FIG. 7). When the drive motor is rotated, the rotational force is transmitted to the winding pipe 51 by way of a joint 20 and a screw 21.

Next, the operation of the winding apparatus of the present invention will be described. When a switch (not shown) is turned on for drawing the blind 4, the drive motor 19 (see FIG. 7) is operated, and the winding pipe 51 is rotated around the round pin 24. The blind 4, which is usually stretched in the drawing direction by means of the drawing mechanisms 10, is drawn while following the movement of the winding pipe 51. In the initial stage, the blind 4 is drawn at the initial angle determined by the positional relationship between the stopper 42a and the rib 41a shown by the solid line in FIG. 2, and after rollers 7 at the leading end portions of the blind 4 are contacted with a rear windshield 30 of a car, the blind 4 is drawn in accordance with the angles of the arm holders 42 which are gradually changed as the rollers 7 are rolled along the inner surface of the rear windshield 30 and moved on the upper end side of the rear windshield 30. The two-dot chain line in FIG. 2 indicates the positions of the arms 10a, 10b and the blind 4 in the case where the blind 4 is drawn up to the upper end of the rear windshield 30. On the other hand, when the switch is turned on for winding the blind 4, the blind 4 is drawn, and the arm holder 42 is finally returned to the initial angle.

The mounting angles of the arm holders 42 are thus automatically adjusted and thereby the angles of the drawing mechanisms 10 are changed, so that the rollers 7 at the leading end portions of the blind 4 are usually rolled within the inner surface of the rear windshield 30. This eliminates the necessity of manually adjusting the mounting angles of the arm holders 42 of the drawing mechanisms in accordance with the inclination of the rear windshield 30 changed on the basis of the type of car. Moreover, since the rollers 7 are usually pressed on the rear windshield 30 by the spring force of the torsion coil spring 43, the rattling of the blind 4 during running of a car can be prevented. Additionally, in the winding apparatus of the present invention, no slit is provided in the winding pipe 51 containing the drive motor 19, and the cylindrical portion 4c is provided on the base end portion of the blind 4 and the blind 4 is fixed to the winding pipe 51 by means of the pressing pipe 52, so that it becomes possible to prevent the leakage of noise caused by the operated drive motor 19 to the outside, and hence to keep the stillness in the car.

The present invention so constructed as described above has the following effects:

The leading end portions of the arms of the drawing mechanisms are energized in the direction substantially perpendicular to the curtain surface by the energizing mechanism; accordingly, for example, in the case where a curtain is provided along a rear windshield of a car, the leading end portions of the curtain can be usually pressed on the rear windshield side, and the arms can be automatically adjusted at an angle along the rear windshield. Consequently, it is possible to eliminate the necessity of manually adjusting the mounting angles of the arm holders of the drawing mechanisms relative to the angle of the rear windshield changed on the basis of on the type of car, and to make easy the mounting work and also shorten the mounting time.

In the winding apparatus of the present invention, moreover, the winding pipe is inserted in the cylindrical portion formed on the base end portion of a curtain and the pressing pipe is fitted around the cylindrical portion, so that the base end portion of the curtain is fixed to the winding pipe and the leading end side of the curtain is drawn from the slit provided in the pressing pipe; accordingly, it becomes possible to eliminate the necessity of providing any slit in the winding pipe containing the drive motor, and hence to prevent leakage of noise from the slit and improve the stillness in the car.

What is claimed is:

1. A curtain winding apparatus comprising:

means for holding a base end portion of a curtain and for winding said curtain;

means for holding a leading end portion of said curtain by means of a leading end portion of an expansible arm, and for drawing said curtain in a direction away from said winding means by stretching said arm; and a spring loaded mechanism for loading said arm in a direction substantially perpendicular to a surface of said curtain drawn by said drawing means so as to urge said leading end portion of said expansible arm against a window.

2. A curtain winding apparatus according to claim 1, in combination with said curtain, wherein the means for drawing includes a winding pipe which holds a base end portion of a curtain and which is rotated for winding said curtain and a drive motor contained in said winding pipe for rotating said winding pipe; and a drawing mechanism for holding a leading end portion of said curtain and drawing said curtain in the direction of separating from said winding mechanism; wherein a cylindrical portion is formed on the base end portion of said curtain; said winding pipe is inserted in said cylindrical portion; a pressing pipe which is C-shaped in cross-section and has a longitudinal slit is fitted around the outer periphery of said winding pipe by way of said cylindrical portion, so that said cylindrical portion is held between said pressing pipe and said winding pipe; and the leading end side of said curtain is drawn from said slit.

3. A curtain winding apparatus according to claim 1, wherein said spring loaded mechanism includes a torsion coil spring, which rotatably holds the other leading end portion of said arm within a plane substantially parallel to the curtain-surface of said curtain, in said direction substantially perpendicular to said curtain surface of said curtain.

4. A curtain winding apparatus according to claim 3, in combination with said curtain, wherein the means for drawing includes a winding pipe which holds a base end portion of a curtain and which is rotated for winding said curtain and a drive motor contained in said winding pipe for rotating said winding pipe; and a drawing mechanism for holding a leading end portion of said curtain and drawing said curtain in the direction of separating from said winding mechanism; wherein a cylindrical portion is formed on the base end portion of said curtain; said winding pipe is inserted in said cylindrical portion; a pressing pipe which is C-shaped in cross-section and has a longitudinal slit is fitted around the outer periphery of said winding pipe by way of said cylindrical portion, so that said cylindrical portion is held between said pressing pipe and said winding pipe; and the leading end side of said curtain is drawn from said slit.

5. A curtain and a curtain winding apparatus comprising:

a winding pipe which holds a base end portion of said curtain and which is rotated for winding said curtain;

a drive motor contained in said winding pipe for rotating said winding pipe; and a drawing mechanism for holding a leading end portion of said curtain and drawing said curtain in the direction away from said winding mechanism;

wherein a cylindrical portion is formed on the base end portion of said curtain; said winding pipe is inserted in said cylindrical portion; a pressing pipe which is C-shaped in cross-section and has a longitudinal slit is fitted around the outer periphery of said winding pipe by way of said cylindrical portion, so that said cylindrical portion is held between said pressing pipe and said winding pipe; and the leading end side of said curtain is drawn from said slit; and a spring loaded mechanism for loading said drawing mechanism in a direction substantially perpendicular to a surface of said curtain drawn by said drawing mechanism so as to urge said drawing mechanism against a window.

* * * * *